(12) United States Patent
Feng

(10) Patent No.: US 12,048,291 B1
(45) Date of Patent: Jul. 30, 2024

(54) BARK CONTROL DEVICE

(71) Applicant: Shenzhen Zhichong Technology Co., Ltd., Shenzhen (CN)

(72) Inventor: Wenjin Feng, Shenzhen (CN)

( * ) Notice: Subject to any disclaimer, the term of this patent is extended or adjusted under 35 U.S.C. 154(b) by 0 days.

(21) Appl. No.: 18/398,560

(22) Filed: Dec. 28, 2023

(30) Foreign Application Priority Data

Dec. 15, 2023 (CN) .......................... 202323436132.2

(51) Int. Cl.
  *A01K 15/02* (2006.01)
  *G02F 1/13357* (2006.01)

(52) U.S. Cl.
  CPC ...... *A01K 15/022* (2013.01); *G02F 1/133603* (2013.01)

(58) Field of Classification Search
  CPC .. A01K 15/022; A01K 27/009; A01K 15/021; G01F 1/133603
  USPC .......................................................... 119/718
  See application file for complete search history.

(56) References Cited

U.S. PATENT DOCUMENTS

| | | | |
|---|---|---|---|
| 11,039,601 B1 * | 6/2021 | Jia .......................... | G01H 17/00 |
| 2018/0132450 A1 * | 5/2018 | Goetzl ................. | A01K 15/021 |
| 2018/0153137 A1 * | 6/2018 | Goetzl ................. | A01K 27/001 |

* cited by examiner

*Primary Examiner* — Yvonne R Abbott-Lewis

(57) ABSTRACT

A bark control device includes an MCU, and a punishment module, a display module, and a power supply module. The punishment module and the display module each are electrically connected to the power supply module. The display module is configured for displaying multi-color graphic information according to a control signal from the MCU. The graphic information includes at least one of a punishment mode of the punishment module, a punishment intensity level of the punishment module, an electric quantity information, and a sensitivity level.

20 Claims, 12 Drawing Sheets

BARK CONTROL DEVICE

CROSS-REFERENCE TO RELATED APPLICATIONS

The application claims priority of Chinese patent application CN2023234361322, filed on Dec. 15, 2023, which is incorporated herein by reference in its entireties.

TECHNICAL FIELD

The present invention relates to the technical field of pet supplies, and particularly relates to a bark control device.

BACKGROUND ART

As we all know, the bark control device is a kind of electronic product that uses ultrasonic waves, electric shock, and other ways to punish pets to achieve the role of stopping barking. However, at present, in the existing bark control devices, indicator lights are generally used to show the working status of the bark control device, but the indicator lights are generally used to show the state of turning on and off. When the bark control device is in the execution of punishment, the user cannot see the current working information of the bark control device, thus affecting the user experience.

SUMMARY

The main purpose of the present invention is to provide a bark control device for solving the problem that the existing bark control device is inconvenient for the user, and affects the user experience.

In order to solve the above technical problems, the present invention provides the following technical solution.

A bark control device includes an MCU, and a punishment module, a display module and a power supply module, the punishment module and the display module each being electrically connected to the power supply module. The display module is configured for displaying multi-color graphic information according to a control signal from the MCU. The graphic information includes at least one of a punishment mode of the punishment module, a punishment intensity level of the punishment module, an electric quantity information, and a sensitivity level.

Further, the display module includes a liquid crystal drive unit electrically connected to the MCU, a liquid crystal display electrically connected to the liquid crystal drive unit, a backlight unit electrically connected to the MCU and the power supply module. The backlight unit is configured for providing a backlight source for the liquid crystal display, and a first drive unit connected between the MCU and the backlight unit. The MCU is configured for driving the liquid crystal display through the liquid crystal drive unit while controlling the first drive unit turn-on to control the turning on and off of the backlight unit.

Further, wherein the backlight unit is a light emitting diode, and the first driving unit includes a first transistor, a first resistor, and a second resistor; one end of the first resistor is electrically connected to the MCU, the other end of the first resistor is connected to a base of the first transistor, an emitter of the first transistor is grounded, a collector of the first transistor is connected to a negative electrode of the light-emitting diode, and two ends of the second resistor are respectively connected to the base of the first transistor and the emitter of the first transistor, and an output end of the power supply module is electrically connected with a positive electrode of the light-emitting diode for supplying the light-emitting diode power.

Further, the display module includes: a light emitting assembly electrically connected to the MCU, a light guide plate provided in the light emitting assembly and directing the light source of the light emitting assembly, and a patterned panel provided on one side of the light guide plate away from one end of the light emitting assembly; the light guide plate has a through-hole at a position corresponding to the light emitting assembly, and the patterned panel is provided with a light-transmitting pattern for transmitting light, and light from the light emitting assembly passes through the through-hole and the light-transmitting pattern in sequence, and then the light-transmitting pattern is projected out.

Further, the light-transmitting pattern includes a power indication pattern for transmitting light out and an electric quantity pattern for transmitting light out, the electric quantity pattern is next to the power indication pattern, the through-hole includes a first hole corresponding to a position of the power indication pattern and a second hole corresponding to a position of the electric quantity pattern; the light emitting assembly includes a first light emitting body corresponding to a position of the first hole and a second light emitting body corresponding to a position of the second hole, and both of the first light emitting body and second light emitting body are electrically connected to the MCU.

Further, the light-transmitting pattern includes a vibration indication pattern for transmitting light out, the through-hole includes a third hole corresponding to a position of the vibration indication pattern, and the light-emitting assembly includes a third light-emitting body corresponding to a position of the third hole and electrically connected to the MCU; and the vibration indication pattern is in the form of a circle, and there is provided in the middle an opaque dot and a plurality of opaque arc-shaped portions disposed adjacent to the dot.

Further, the light-transmitting pattern includes an electric shock indication pattern for transmitting light out, the through-hole includes a fourth hole corresponding to a position of the electric shock indication pattern, and the light-emitting assembly includes a fourth light-emitting body corresponding to a position of the fourth hole and electrically connected to the MCU; and the electric shock indication pattern is in the form of a circle and is provided with an opaque slash portion and two broken line portions located at two sides of the slash portion.

Further, the light-transmitting pattern includes a numerical pattern for displaying an intensity level in the shape of "8", the through-hole includes a fifth hole corresponding to a position of the numerical pattern, and the light-emitting assembly includes seven fifth light-emitting bodies corresponding to a position of the fifth hole and electrically connected to the MCU, and the seven fifth light-emitting bodies are in a distribution of a shape of "8".

Further, the bark control device further includes a sound detection unit electrically connected to the MCU, the sound detection unit is used to convert the picked up sound into an electrical signal and then feed back to the MCU, the MCU is configured for driving the punishment module to work according to the electrical signal fed back from the sound detection unit.

Further, the sound detection unit includes a microphone, a third resistor, a fourth resistor, a fifth resistor, a sixth resistor, a first capacitor, a second capacitor and an operational amplifier;

a first pin of the operational amplifier is connected to an output of a power supply module, the output of the power supply module is also electrically connected to a positive electrode of a microphone through a third resistor, the positive electrode of the microphone is connected to the third pin of the operational amplifier through a first capacitor and a fourth resistor in sequence, a fourth pin of the operational amplifier is connected to the MCU through a fifth resistor, the fourth pin of the operational amplifier is connected to its third pin through a sixth resistor, and the second capacitor is connected in parallel with the sixth resistor.

Further, the bark control device further includes a motion detection unit electrically connected to the MCU and configured for detecting a movement of the pet's laryngeal prominence; the motion detection unit is configured for feeding back an electrical signal to the MCU when it detects the occurrence of a movement, and the MCU is configured for driving the punishment module to work according to the electrical signal fed back from the motion detection unit and according to the electrical signal fed back from the sound detection unit.

Further, the motion detection unit includes a motion sensing chip, the power supply module is electrically connected to a third pin of the motion sensing chip, the MCU is connected to an SCL pin of the motion sensing chip for transmitting a clock signal to the motion sensing chip, an SDA pin of the motion sensing chip is electrically connected to the MCU for transmitting to the MCU a detected motion signal after the detected motion signal has been converted into an electrical signal, and the MCU is configured for driving the punishment module to work based on the signal fed back from the SDA pin of the motion sensing chip.

Further, the bark control device further includes a voltage stabilizing unit connected between the power supply module and the motion sensing chip, the voltage stabilizing unit being used to output a voltage output from the power supply module to the motion sensing chip after regulating the voltage;

the voltage stabilizing unit includes a voltage stabilizing chip and a seventh resistor, a first pin of the voltage stabilizing chip is connected to an output of the power supply module, a second pin of the voltage stabilizing chip is grounded, a fifth pin of the voltage stabilizing chip is connected to a third pin of the motion sensing chip, and a third pin of the voltage stabilizing chip is connected to the MCU via the seventh resistor.

Further, the punishment module includes a vibration punishment unit, the vibration punishment unit including a vibration motor, a motor interface, and a motor drive unit electrically connected to the MCU, the motor interface being electrically connected to the vibration motor, the motor drive unit, and the power supply module respectively; and the motor drive unit is energized by an electrical signal output from the MCU in order to drive the vibration motor to work via the motor interface;

the motor driving unit includes an eighth resistor, a ninth resistor and a third transistor, the MCU connecting a base of the third transistor via the eighth resistor, the base electrode of the third transistor connecting its emitter via the ninth resistor, an emitter of the third transistor being grounded, and the collector electrode of the third transistor connecting to a negative electrode of the vibration motor through the motor interface.

Further, the punishment module includes a sound unit, the sound unit includes a sound driving unit and a sound player; a positive electrode of the sound player is electrically connected to the output of the power supply module, and the sound driving unit is electrically connected to the MCU, a negative electrode of the sound player; the sound driving unit is configured for driving the sound player to play according to an electrical signal output from the MCU;

the sound player includes a loudspeaker, the sound driving unit includes a fourth transistor, a tenth resistor, and an eleventh resistor, a base of the fourth transistor is connected to an MCU through the tenth resistor, an emitter of the fourth transistor is grounded, a collector of the fourth transistor is connected to a positive electrode of the loudspeaker, and two ends of the eleventh resistor are connected respectively to the base and the emitter of the fourth transistor; and the fourth transistor is conducted according to the electrical signal output by the MCU in order to drive the loudspeaker to play sound.

Further, the punishment module includes an electric shock punishment unit, the electric shock punishment unit including: a voltage output terminal, a transformer electrically connected to the voltage output terminal, and an electric shock drive unit electrically connected to the transformer and the MCU, respectively; the output terminal of the power supply module is also electrically connected to the transformer for supplying power to the transformer, and the electric shock drive unit is conducted according to control signals output from the MCU to enable the transformer to output a voltage to the voltage output terminal.

Further, the electric shock driving unit includes a fifth transistor, a twelfth resistor, a thirteenth resistor; a base of the fifth transistor is connected to the MCU through the twelfth resistor, an emitter of the fifth transistor is grounded, a collector of the fifth transistor is connected to the positive electrode of the speaker; and two ends of the thirteenth resistor are connected to the base and the emitter of the fifth transistor, respectively; and the fourth transistor conducts according to the electrical signals output by the MCU in order to drive the speaker to play sound.

Further, the bark control device further includes a switch assembly electrically connected to the MCU for operation by the user, and the MCU realizes at least one of powering on, powering off, switching to the punishment mode, and adjusting the intensity of the punishment of the bark control device according to the electrical signal fed back by the switch assembly.

Further, the switch assembly includes a switch button electrically connected to the MCU, the MCU realizing power on or power off of the bark control device according to the electrical signal fed back from the switch button; the switch assembly includes a function button electrically connected to the MCU, and the MCU is configured for switching to at least one of a punishment mode, adjusting the intensity of electric shock, adjusting the intensity of vibration, and a sensitivity level according to the electrical signal fed back from the function button.

Further, the bark control device includes: an indication unit electrically connected to the MCU and the power supply module, and an indication driving unit electrically connected to the indication unit and the MCU respectively; the indication driving unit conducts according to an electrical signal output from the MCU to drive the indication unit to work;

the indication driving unit includes a sixth transistor, a fourteenth resistor and a fifteenth resistor, a base of the sixth transistor is connected to the MCU through the fourteenth resistor, an emitter of the sixth transistor is grounded, a collector of the sixth transistor is connected to an output of the indication unit, and two ends of the fifteenth resistor are respectively electrically connected to the base and emitter of the sixth transistor.

The present invention has the following beneficial effects. Compared to the prior art, the present invention realizes the display of multi-color graphic information using a display module. The graphic information includes one or more of the punishment modes of the punishment module, the punishment intensity level of the punishment module, the sensitivity level, and the power level of the power module. In this way, the user can intuitively understand the current power information, punishment mode, punishment intensity, and other information of the bark control device according to the content displayed by the display module. The bark control device is convenient for the user.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
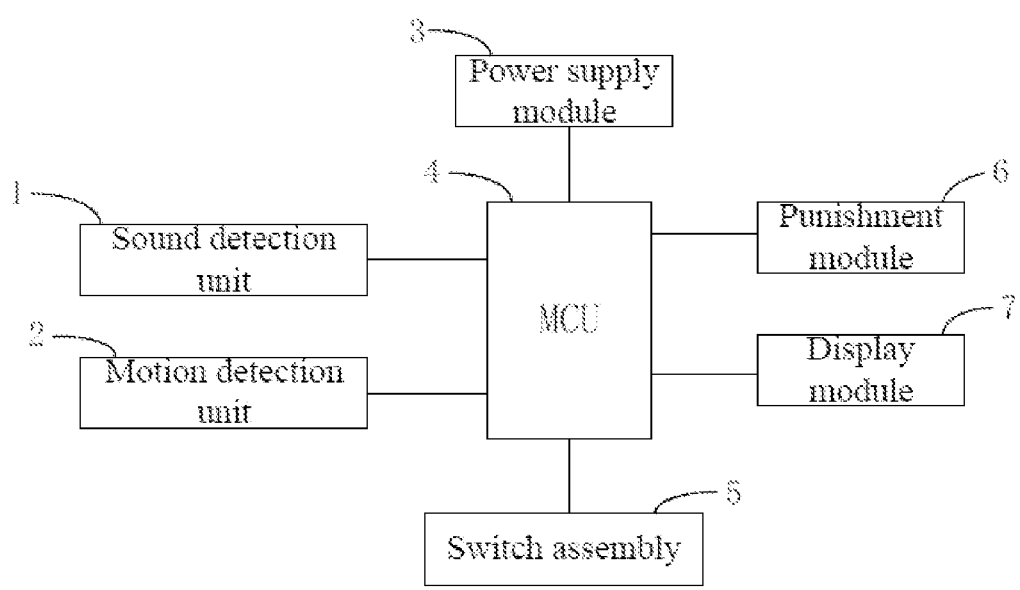
FIG. 1 shows a schematic block diagram of the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the said features. In the description of embodiments of the application, "a plurality of" means two or more, unless otherwise specifically defined.

Referring to FIGS. 1-19, a bark control device according to an embodiment is shown.

Referring to FIG. 1, the bark control device includes an MCUU2, a punishment module 6 electrically connected to the MCUU2, a display module 7 electrically connected to the MCUU2, and a power supply module 3 electrically connected to the MCUU2, and the punishment module 6 and the display module 7 are electrically connected to the power supply module 3. The display module 7 is used to display multi-color graphic information according to the control signal of the MCUU2. The graphic information includes one or more of punishment modes of the punishment module 6, a punishment intensity level of the punishment module 6, a sensitivity level, and information of an electric quantity.

This embodiment realizes the display of the multi-color graphic information by the display module 7. The graphic information includes one or more of the punishment modes of the punishment module 6, the punishment intensity level of the punishment module 6, the sensitivity level, and the power quantity of the power supply module 3. The user can intuitively understand the current power information, the punishment mode, the punishment intensity, and other information about the bark stopper according to the content displayed by the display module 7, which is convenient for the user to use. Accordingly, the problem of unsatisfied user experience is solved.

Figure 2:
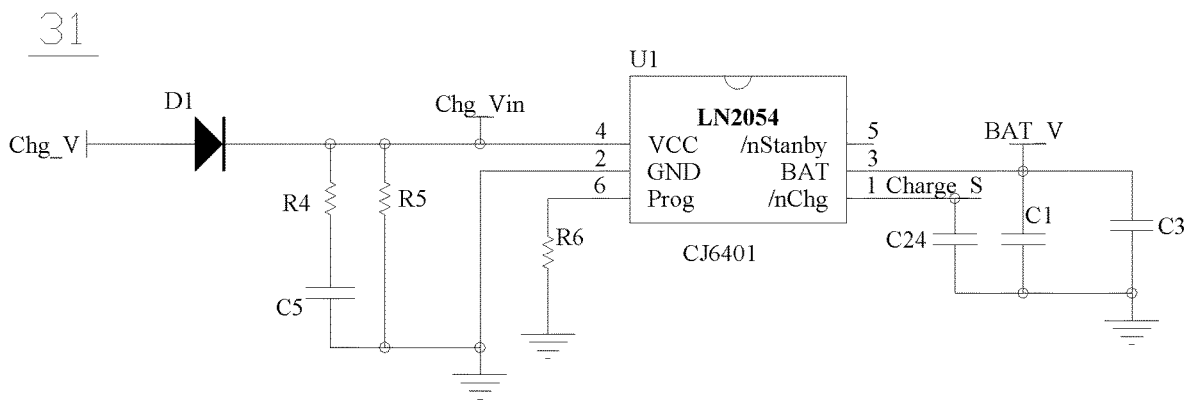
FIG. 2 shows a circuit diagram of the charging and discharging circuit of the present invention.
Figure 3:
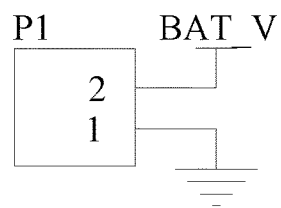
FIG. 3 shows a circuit diagram of a battery interface of the present invention.

Specifically, with reference to FIGS. 2-3, the power supply module 3 includes a charging and discharging circuit 31 and a battery interface 32 electrically connected to the charging and discharging circuit 31. The battery interface 32 is used to connect a battery for charging the battery and supplying power to the MCUU2, the punishment module 6, and the display module 7 when the charging and discharging circuit 31 is connected to an external power source. The output of the power supply module 3 is electrically connected to the positive electrode of the battery.

Figures 4, 5:
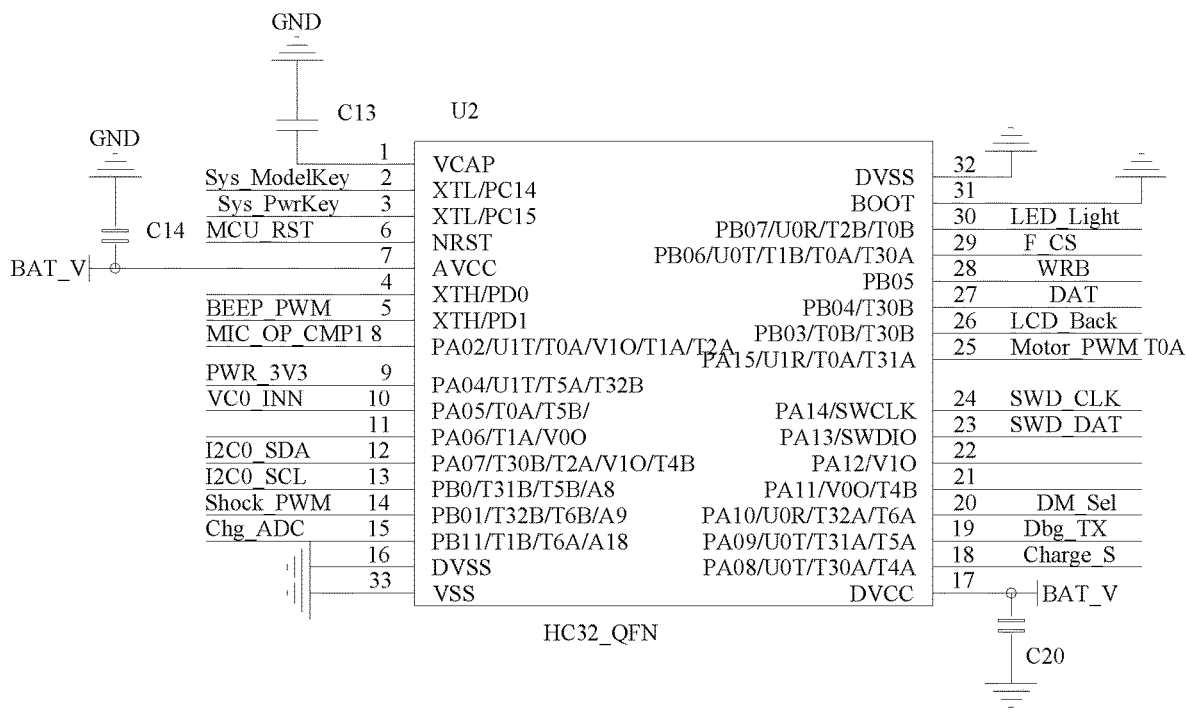
FIG. 4 shows a circuit diagram of an microcontroller unit (MCU) of the present invention.
FIG. 5 shows a circuit diagram of the sound detection unit of the present invention.

In an embodiment, referring to FIGS. 4-5, the bark control device further includes a sound detection unit 1 electrically connected to the MCUU2. The sound detection unit 1 is used to convert the pick-up sound into an electrical signal and then feed it back to the MCUU2. The MCUU2 drives the punishment module 6 to work according to the electrical signal fed back by the sound detection unit 1. When the pet barks, the sound detection unit 1 detects the sound and feeds back the electrical signal to the MCUU2. The MCUU2 drives the punishment module 6 to work based on the electrical signal to punish the pet through the punishment module 6 when the pet barks, thus stopping barking.

Specifically, the sound detection unit 1 includes a microphone MIC1, a third resistor R14, a fourth resistor R15, a fifth resistor R13, a sixth resistor R17, a first capacitor C11, a second capacitor C12, and an operational amplifier U3, and a first pin of the operational amplifier U3 is connected to an output of the power supply module 3. The output of the power supply module 3 is also connected to the positive electrode of the microphone MIC1 through the third resistor R14. A positive terminal of the microphone MIC1 is connected to a third pin of the operational amplifier U3 through the first capacitor C11 and the fourth resistor R15 in turn. A fourth pin of the operational amplifier U3 is connected to the MCUU2 via the fifth resistor R13, and a fourth pin of the operational amplifier U3 is connected to the third pin of the operational amplifier U3 via the sixth resistor R17. The second capacitor C12 is connected in parallel with the sixth resistor R17. When the pet barks, the microphone MIC1 picks up the sound and converts it into an electrical signal, and transmits it to the operational amplifier U3 for amplification before transmitting it to the MCUU2. The MCUU2 punishes the pet through the punishment module 6 based on the electrical signal fed back by the operational amplifier U3.

Figure 6:
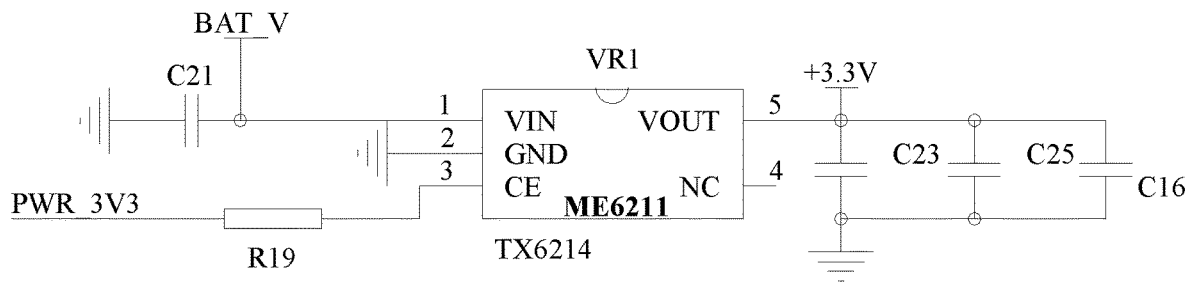
FIG. 6 shows a circuit diagram of a voltage stabilizing unit of the present invention.
Figure 7:
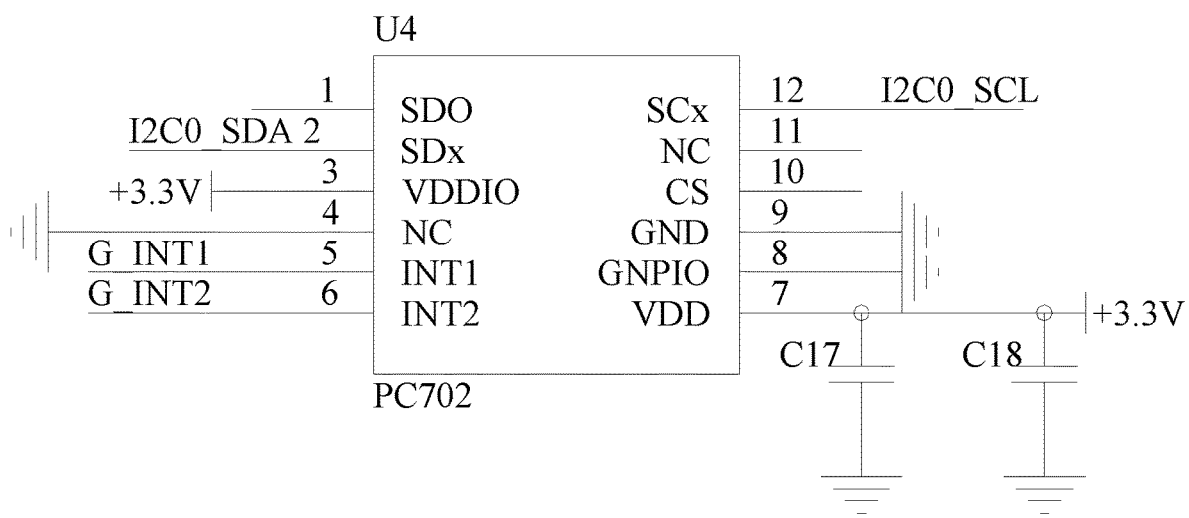
FIG. 7 shows a circuit diagram of a motion sensing chip of the present invention.

In an embodiment, with reference to FIGS. 6-7, the bark control device further includes a motion detection unit 2 electrically connected to the MCUU2 for detecting the movement of the pet's laryngeal prominence. The motion detection unit 2 feeds back an electrical signal to the MCUU2 when it detects that a movement has occurred, and the MCUU2 drives the punishment module 6 to work based on the electrical signal fed back from the motion detection unit 2 as well as based on the electrical signal fed back from the sound detection unit 1. In actual use, i.e., when the bark control device is fixed to the pet's neck through a collar, the motion detection unit 2 is attached to the position of the pet's laryngeal prominence, and when the pet barks, the motion detection unit 2 detects a movement of the pet's laryngeal prominence. When the pet barks, the microphone MIC1 can pick up the sound, and the MCUU2 drives the punishment module 6 to work only according to these two electrical signals (i.e., the movement of the pet's laryngeal prominence, and the sound), to prevent the pet from being punished by mistake when other sounds are louder. The present bark control device can prevent the problem that one pet barking causes all pets to be punished when there are many pets. Thus, the accuracy of the punishment is improved.

Specifically, the motion detection unit 2 includes a motion sensing chip U4, which specifically may be a PC702 model motion sensing chip. The power supply module 3 is electrically connected to a third pin of the motion sensing chip U4 to supply power to the motion sensing chip U4. The MCUU2 is connected to an SCL pin of the motion sensing chip U4 for transmitting a clock signal to the motion sensing chip U4. An SDA pin of the motion sensing chip U4 is electrically connected to the MCUU2 for converting the detected motion signal into an electrical signal and transmitting it to the MCUU2, which drives the punishment module 6 according to the signal fed back from the SDA pin of the motion sensing chip U4.

The bark control device further includes a voltage stabilizing unit 21 connected between the power supply module 3 and the motion sensing chip U4, and the voltage stabilizing unit 21 is used to output the voltage output from the power supply module 3 to the motion sensing chip U4 after regulating the voltage output from the power supply module 3. The voltage stabilizing unit 21 includes a voltage stabilizing chip VR1 and a seventh resistor R19. A first pin of the voltage stabilizing chip VR1 is connected to the output terminal of the power supply module 3. A second pin of the voltage stabilizing chip VR1 is grounded, and a fifth pin of the voltage stabilizing chip VR1 is connected to a third pin of the motion sensing chip U4. A third pin of the voltage stabilizing chip VR1 is connected to the MCUU2 via the seventh resistor R19. The voltage stabilizing unit 21 is a voltage stabilizing microcontroller, which can be a TX6214 model chip. The voltage stabilizing unit 21 is used to supply power to the motion sensing chip U4 after regulating the voltage output from the output end of the power supply module 3.

Figure 8:
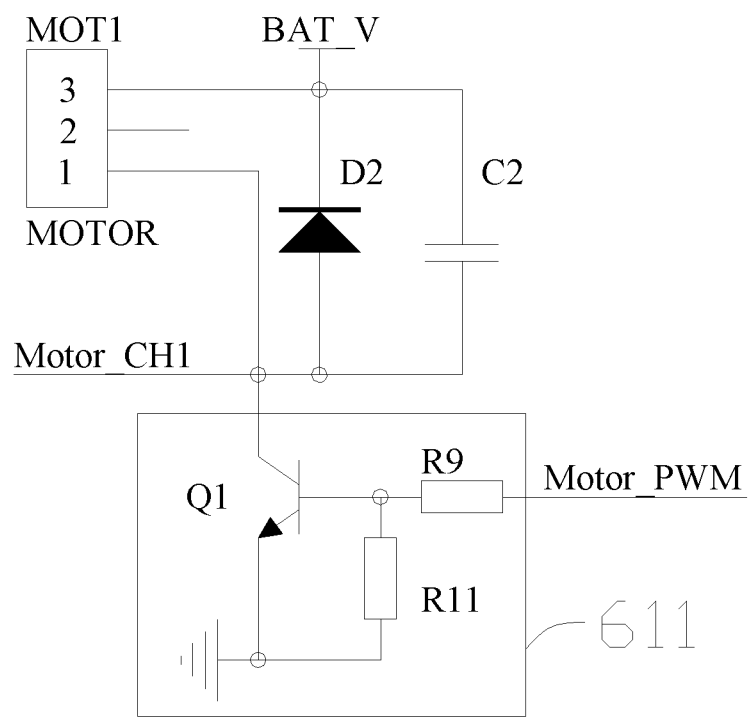
FIG. 8 shows a circuit diagram of the vibration punishment unit of the present invention.

In an embodiment, referring to FIG. 8, the punishment module 6 includes a vibration punishment unit 61, the vibration punishment unit 61 includes a vibration motor, a motor interface MOT1, and a motor drive unit 611 electrically connected to the MCUU2. The motor interface MOT1 is electrically connected to the vibration motor, the motor drive unit 611, and the power supply module 3 respectively. The motor drive unit 611 is energized by the electrical signal output from the MCUU2 to drive the vibration motor through the motor interface MOT1 by the voltage output from the power supply module 3 to work, and the vibration motor vibrates, which can stimulate the pet to achieve the effect of stopping barking.

Specifically, the motor driving unit 611 includes an eighth resistor R9, a ninth resistor R11, and a third transistor Q1. The MCUU2 connects a base of the third transistor Q1 through the eighth resistor R9. A base of the third transistor Q1 is connected to its own emitter through the ninth resistor R11. An emitter of the third transistor Q1 is grounded. A collector of the third transistor Q1 is connected to the negative electrode of the vibration motor through the motor interface MOT1. The MCUU2 outputs an electric signal to the third transistor Q1 according to the electric signal fed back from the motion detecting unit 2 and according to the electric signal fed back from the sound detecting unit 1, causing the third transistor Q1 to conduct to drive the vibration motor. An output power of the vibration motor can be adjusted by adjusting parameters of the pulse signal output by the MCUU2 to the third transistor Q1. In this way, the strength of vibration of the vibration motor can be adjusted.

Figure 9:
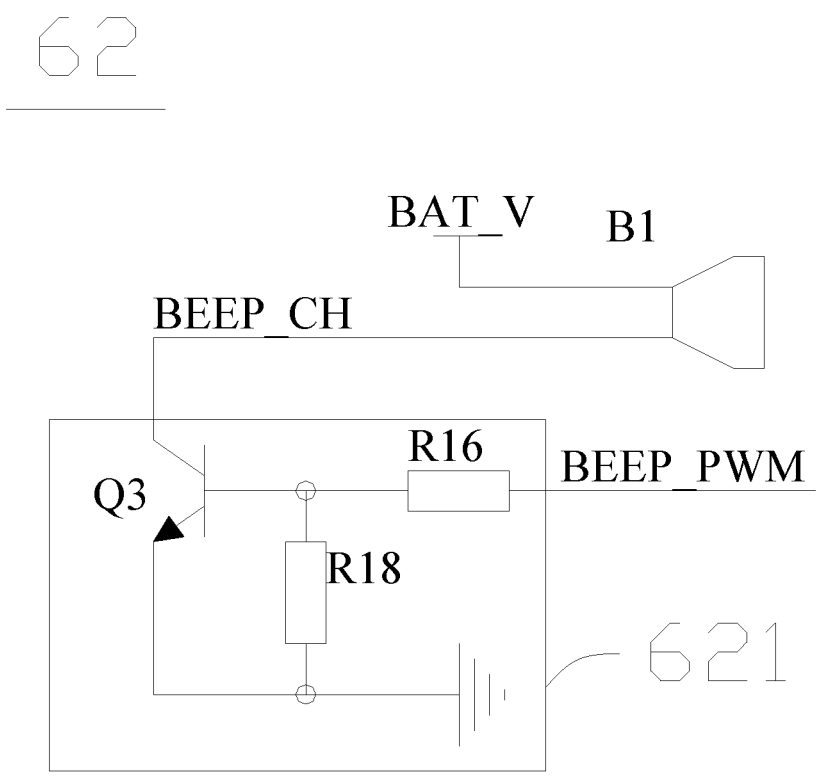
FIG. 9 shows a circuit diagram of the sound punishment unit of the present invention.

In one embodiment, referring to FIG. 9, the punishment module 6 includes a sound unit 62, and the sound unit 62 includes a sound driver unit 621 and a sound player B1. A positive electrode of the sound player B1 is electrically connected to the output terminal of the power supply module 3, and the sound driver unit 621 is electrically connected to the negative electrode of the MCUU2 and the sound player B1 respectively. The sound player B1 is driven to play sound to punish the pet according to the electrical signal output from the MCUU2, thus stopping barking. Specifically, the sound can be a reprimand audio, or a frequency conversion sound.

The sound player B1 is a loudspeaker, and the sound driving unit 621 includes a fourth transistor Q3, a tenth resistor R16, and an eleventh resistor R18, and the base of the fourth transistor Q3 is connected to the MCUU2 through the tenth resistor R16, the emitter of the fourth transistor Q3 is grounded, and the collector of the fourth transistor Q3 is connected to the positive electrode of the loudspeaker. The two ends of the eleventh resistor R18 are connected to the base and the emitter of the fourth transistor Q3 respectively. The fourth transistor Q3 conducts by an electrical signal output by the MCUU2 to drive the speaker to play sound. Based on an electrical signal fed back by the motion detection unit 2 and an electrical signal fed back by the sound detection unit 1, the MCUU2 outputs an electrical signal to the fourth transistor Q3, so that the fourth transistor Q3 is conducted and thus, the loudspeaker plays sound.

Figure 10:
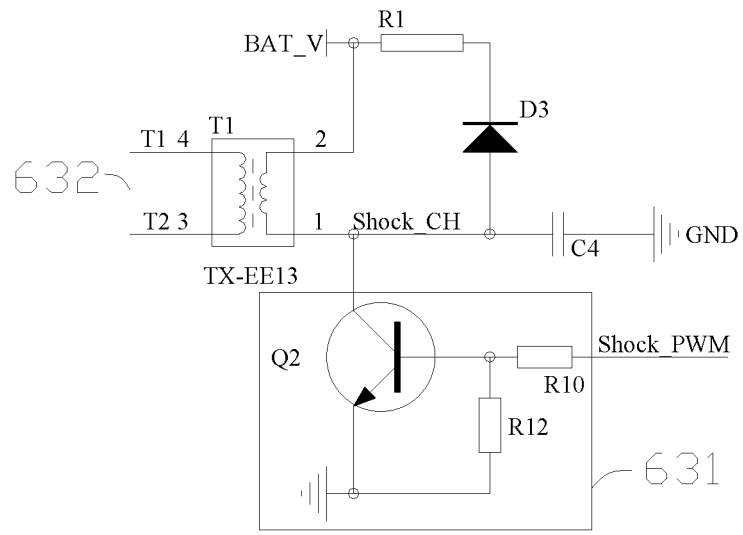
FIG. 10 shows a circuit diagram of the electric shock punishment unit of the present invention.

In an embodiment, referring to FIG. 10, the punishment module 6 includes an electric shock punishment unit 63; the electric shock punishment unit 63 includes a voltage output terminal 632, a transformer T1 electrically connected to the voltage output terminal 632, and an electric shock driving unit 631 electrically connected to the transformer T1 and the MCUU2, respectively. An output terminal of the power supply module 3 is also electrically connected to the transformer T1 for supplying the transformer T1 with power. The electric shock driving unit 631 conducts according to the control signal output from the MCUU2, causing the transformer T1 to output voltage to the voltage output terminal 632 to stimulate the pet, thus stopping pets from barking.

The transformer T1 is used to step up the voltage output from the power supply module 3 to achieve a voltage that stimulates the pet for a punishing effect. The electric shock driving unit 631 includes a fifth transistor Q2, a twelfth resistor R10, and a thirteenth resistor R12. The base electrode of the fifth transistor Q2 is connected to the MCUU2 via the twelfth resistor R10, the emitter of the fifth transistor Q2 is grounded, and the collector of the fifth transistor Q2 is connected to the positive electrode of the speaker. The two ends of the thirteenth resistor R12 are connected to the base and the emitter of the fifth transistor Q2 respectively, and the fourth transistor Q3 is conducted according to an electrical signal output by the MCUU2 to drive the speaker to play sound. Based on the electrical signal fed from the motion detecting unit 2 and the electrical signal fed from the sound detection unit 1, the MCUU2 outputs an electrical signal to the fifth transistor Q2 to make the fifth transistor Q2 turn-on, so that the transformer T1 outputs a voltage to the voltage output terminal 632. According to the parameters of the pulse signal output by the MCUU2 to the fifth transistor Q2, the voltage output by the transformer T1 to the voltage output terminal 632 can be adjusted, thus adjusting the intensity of the electric shock.

Figure 16:
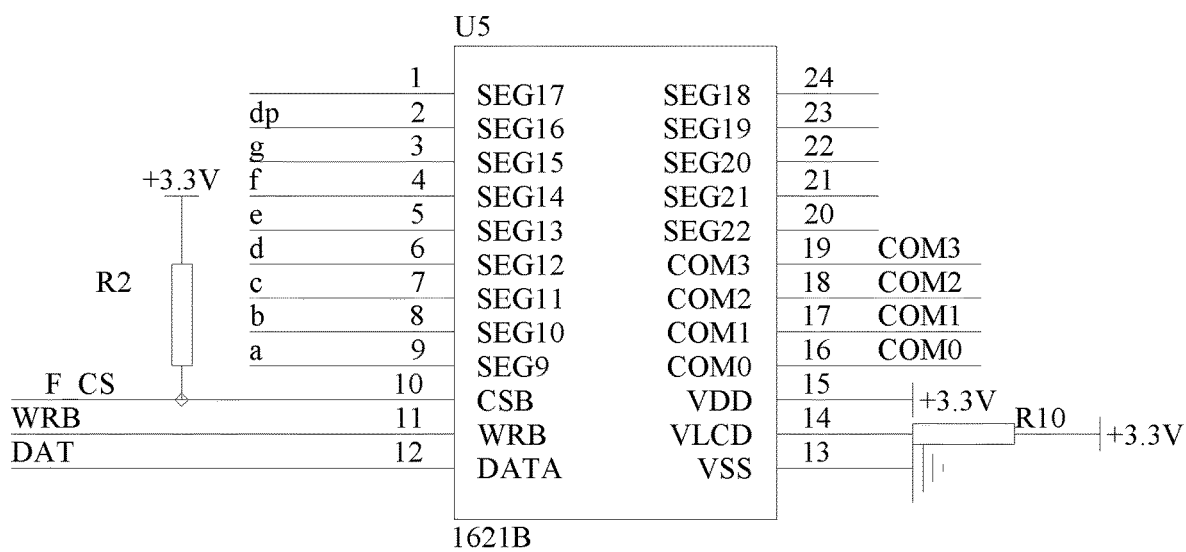
FIG. 16 shows a circuit diagram of a liquid crystal drive unit of the present invention.
Figure 17:
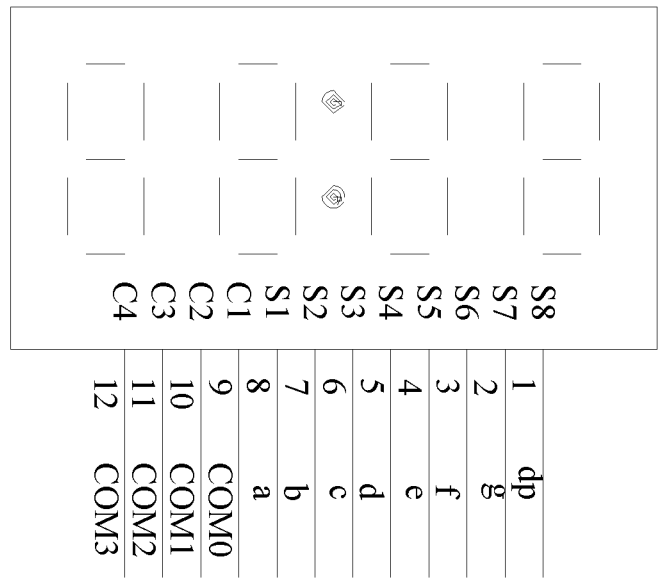
FIG. 17 shows a circuit diagram of a liquid crystal display of the present invention.
Figure 18:
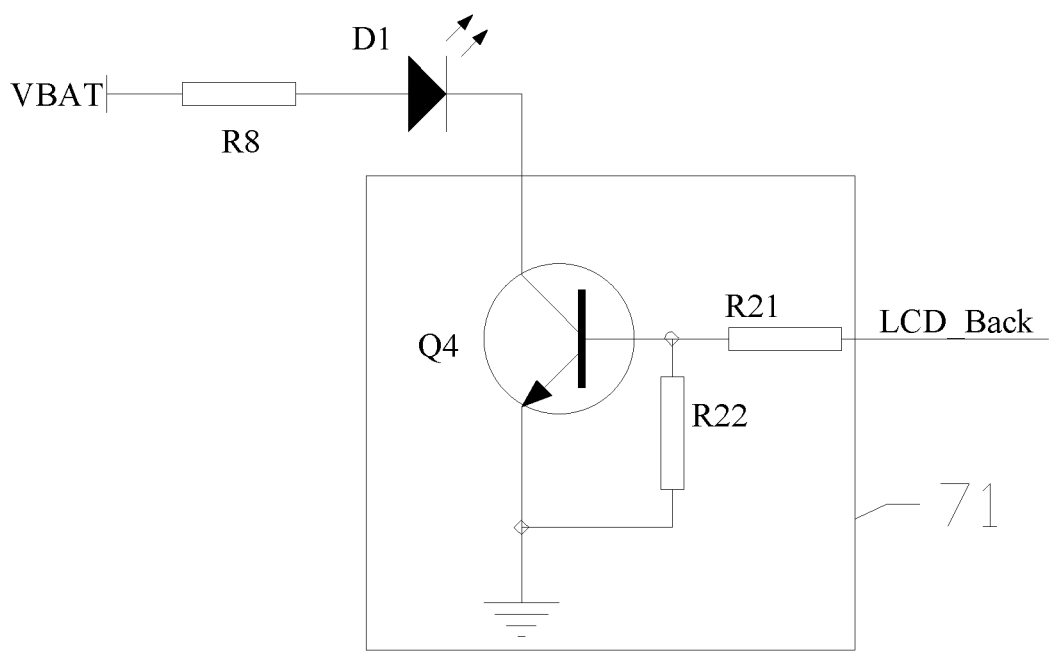
FIG. 18 shows a circuit diagram of a backlight unit of the present invention.

In an embodiment, referring to FIGS. 16-18, the display module 7 includes a liquid crystal drive unit U5 electrically connected to the MCUU2, a liquid crystal display LCD2 electrically connected to the liquid crystal drive unit U5, a backlight unit D1, and a first drive unit 71 connected between the MCUU2 and the backlight unit D1. The backlight unit D1 is electrically connected to the MCUU2 and the power supply module 3 respectively. The backlight unit D1 is configured for providing a backlight source for the liquid crystal display LCD2. The liquid crystal display LCD2 can be used to display multi-color graphic information, and the MCUU2 drives the liquid crystal display LCD2 to light up through the liquid crystal drive unit U5. The MCUU2 simultaneously controls the first driving unit 71 to conduct to control the backlight unit D1 to turn on and off, so as to facilitate the user to visualize the information when the bark control device is turned on.

Specifically, the liquid crystal driver unit U5 may be an LCD liquid crystal driver chip, specifically, an SEG15 model chip. The backlight unit D1 is a light-emitting diode, and the first driver unit 71 includes a first transistor Q4, a first resistor R21, and a second resistor R22. One end of the first resistor R21 is electrically connected to the MCUU2, and the other end is connected to the base of the first transistor Q4. The emitter of the first transistor Q4 is grounded, and the collector of the first transistor Q4 is connected to the negative electrode of the light-emitting diode. The two ends of the second resistor R22 are connected to the base of the first transistor Q4 and the emitter of the first transistor Q4 respectively. The output of the power supply module 3 is electrically connected to the positive terminal of the light-emitting diode for supplying power to the light-emitting diode. After powering on, the MCUU2 can drive the liquid crystal display LCD2 to display through the liquid crystal drive unit U5, which can output an electrical signal to the first transistor Q4, causing the first transistor Q4 turn-on. In this way, when the power supply module 3 feeds the light emitting diode power, the light emitting diode is turned on and plays the role of a backlight plate.

In another embodiment, referring to FIGS. 12-15, the display module 7 may include a light emitting assembly 71 electrically connected to the MCUU2, a light guide plate 102, and a patterned panel 101. The light guide plate 102 is disposed in the light emitting assembly 71 and for exporting the light of the light emitting assembly 71. The patterned panel 101 is disposed in the light guide plate 102 at one side away from the light emitting assembly 71. The light guide plate 102 is provided with a through hole 1020 corresponding to the position of the light emitting assembly 71. The patterned panel 101 is provided with a light transmission pattern 1010 for transmitting light, and the light from the light emitting assembly 71 passes through the through hole 1020 and the light transmission pattern 1010 in turn, and then the light transmission pattern 1010 is projected out, so that the color of the light emitted by the light emitting assembly 71 is utilized for obtaining a corresponding multi-colored pattern display. It should be understood that the patterned panel 101 is made of a light transmissive material at the position of the light-transmitting pattern 1010, and the patterned panel 101 at other part is made of an opaque material. Accordingly, a light-transmitting pattern 1010 can be obtained when the light emitted by the light source passes through the through hole 1020 and the light-transmitting pattern 1010.

Specifically, in this embodiment, the light-transmitting pattern 1010 includes a power indication pattern 1011 for transmitting the light out, and an electric quantity pattern 1012 located next to the power indication pattern 1011 for transmitting the light out. The through-hole 1020 includes a first hole 1021 corresponding to the position of the power indication pattern 1011 and a second hole 1022 corresponding to the position of the electric quantity pattern 1012. The light emitting assembly 71 includes a first light emitting body 43 corresponding to the position of the first hole 1021, and a second light emitting body 44 corresponding to the position of the second hole 1022. Both the first light emitting body 43 and the second light emitting body 44 are electrically connected to the MCUU2.

The light of the first light emitting body 43 may be the same as or different from that of the second light emitting body 44. The power indication pattern 1011 may be in the shape of a "BATTERY" and other patterns. The power pattern 1012 may be a plurality of lamps distributed in a rectangle, a square, circular circle. For example, the power pattern 1012 includes four rectangles, a quantity of the second light emitting bodies 44 is four, and a quantity of the second holes 1022 is four. When the battery 5 is fully charged, the four second light emitting bodies 44 emit light, i.e., in visual effect, all four rectangular patterns can be seen to be brightly lit. When the electric quantity of the battery 5 is half, two second light emitting bodies 44 emit light, i.e., in visual effect, two rectangular patterns can be seen to be all brightly lit. In this way, the user can understand the electric quantity of the battery of the present embodiment.

The light-transmitting pattern 1010 includes a vibration indication pattern 1013 for transmitting light out, and the through hole 1020 includes a third hole 1023 corresponding to the position of the vibration indication pattern 1013. The light-emitting assembly 71 includes a third light emitting body 45 corresponding to the position of the third hole 1023, and the third light emitting body 45 is electrically connected to the MCUU2. The vibration indication pattern 1013 is circular in shape, with an opaque dot 10213b in the center of the pattern, and the vibration indication pattern 1013 includes a plurality of opaque arc-shaped parts 10213a next to the dot 10213b. When the vibration motor operates, the MCUU2 controls the third light emitting body 45 to emit light, and thus, the vibration indication pattern 1013 can be displayed. Thus, the vibration indication pattern 1013 indicates a status of the vibration motor.

The light-transmitting pattern 1010 includes an electric shock indication pattern 1014 for transmitting light, and the through-hole 1020 includes a fourth hole 1025 corresponding to the position of the electric shock indication pattern 1014. The light emitting assembly 71 includes a fourth light emitting body 47 corresponding to the position of the fourth hole 1025 and electrically connected to the MCUU2. The electric shock indication pattern 1014 is circular in shape, and there is a slash portion 1014a, and two broken line portions 1014b located at two opposite sides of the slash portion 1014a. When the voltage output terminal 632 outputs a voltage, the MCUU2 controls the fourth light emitting body 47 to emit light, and accordingly, the electric shock indication pattern 1014 is displayed, thus indicating a status of electric shock operation.

The light-transmitting pattern 1010 includes a numerical pattern for displaying an intensity level and is in the shape of an "8". The through-hole 1020 includes a fifth hole 1024 corresponding to the position of the numerical pattern. The light-emitting assembly 71 includes seven fifth light-emitting bodies 46 corresponding to the position of the fifth hole 1024 and electrically connected to the MCUU2. The seven fifth light-emitting bodies 46 are distributed in the shape of an "8". When the electric shock intensity or the vibration intensity is 4 levels (grades) in total, and the current electric shock intensity or the vibration intensity is in lever three, the MCUU2 controls the corresponding fifth light emitting body 46 to emit light, thus displaying the number 3.

Figure 11:
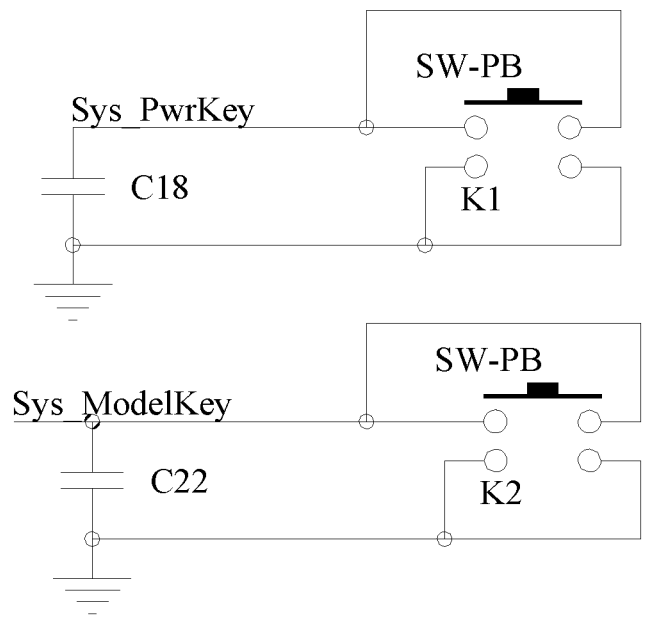
FIG. 11 shows a circuit diagram of a switch assembly of the present invention.
Figure 12:
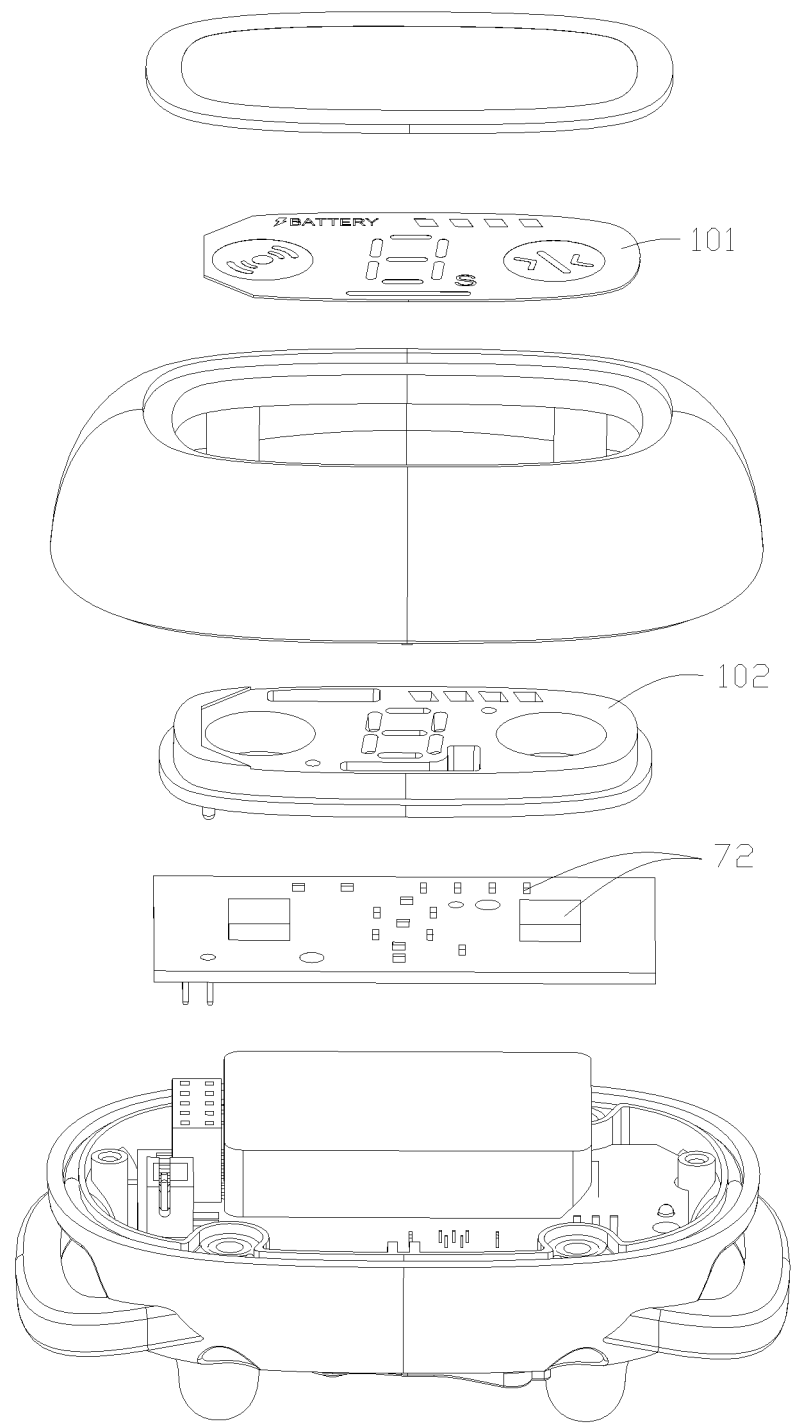
FIG. 12 shows a structural diagram of a display unit of an embodiment of the present invention.
Figure 13:
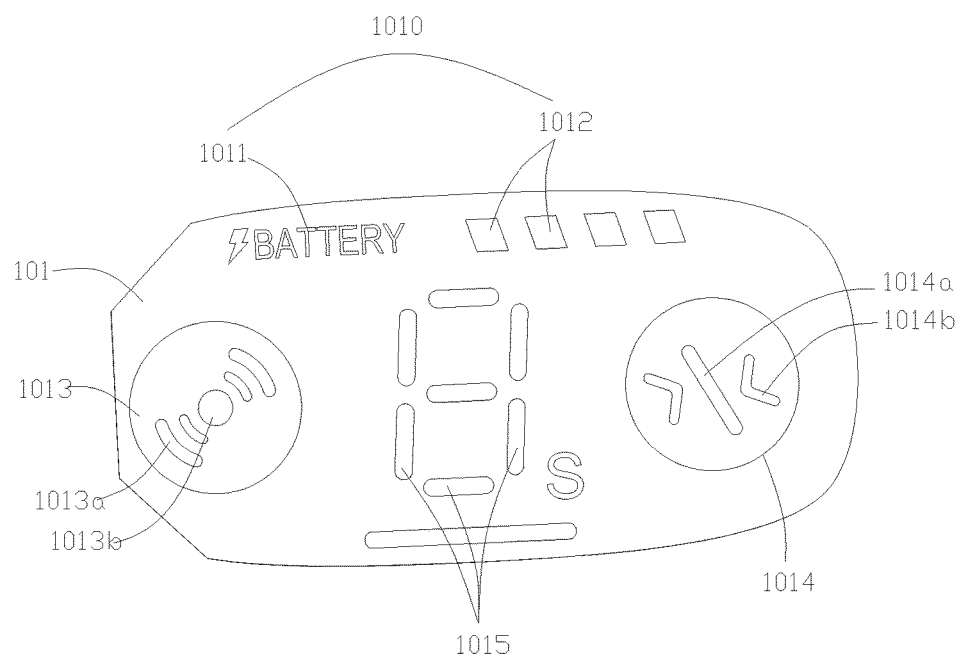
FIG. 13 shows a structural diagram of a patterned panel of an embodiment of the present invention.
Figure 14:
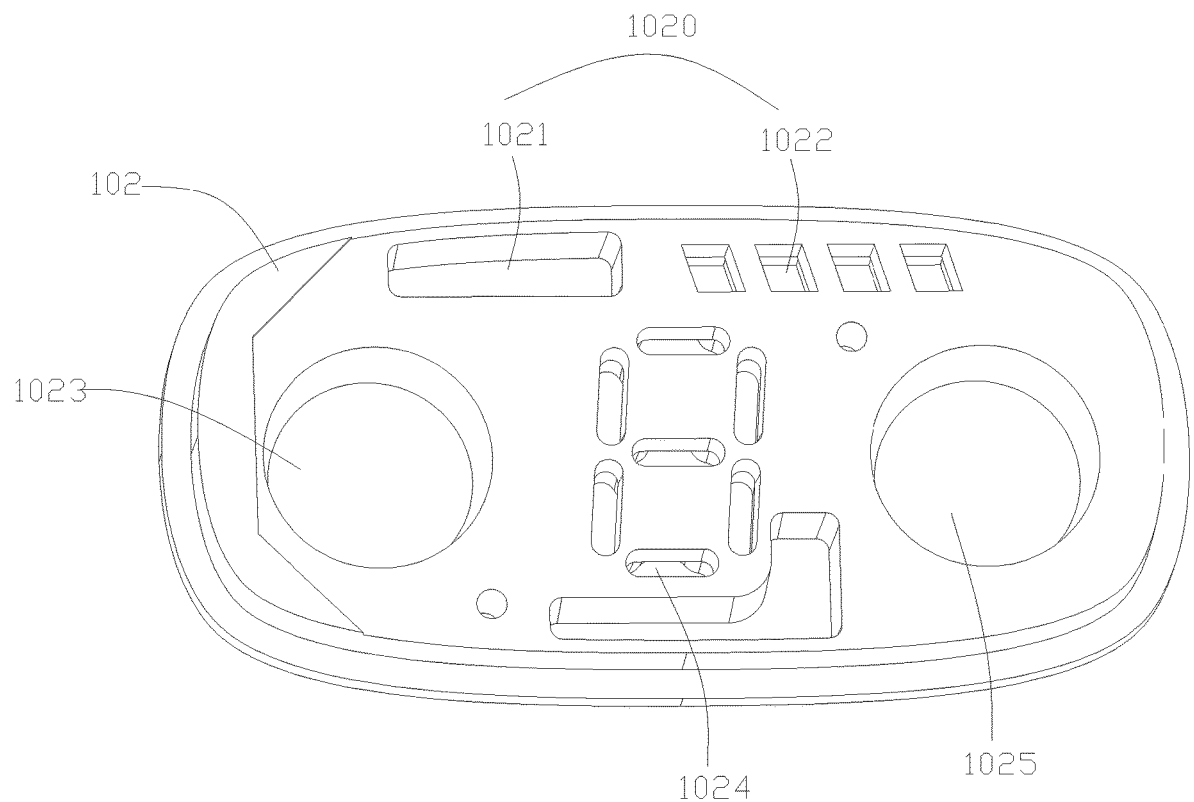
FIG. 14 shows a structural diagram of a light guide of an embodiment of the present invention.
Figure 15:
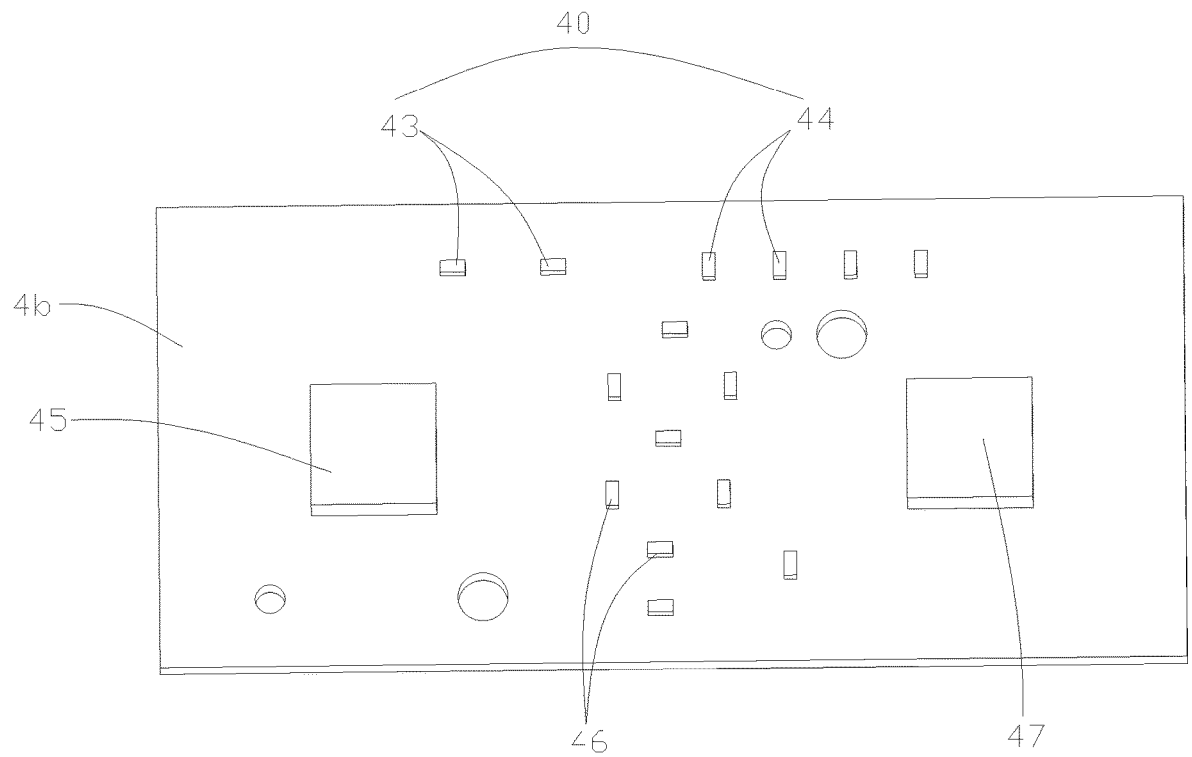
FIG. 15 shows a distribution diagram of a light emitting assembly of an embodiment of the present invention.

In this embodiment, referring to FIG. 11, the bark control device further comprises a switch assembly 5 electrically connected to the MCUU2 for operation by the user. The MCUU2 realizes at least one function of powering on of the bark control device, powering off, switching the punishment modes, and adjusting the punishment intensity of the bark control device based on the electrical signals fed back by the switch assembly 5.

Specifically, the MCUU2 may be an HC32L130 model chip. The switch assembly 5 includes a switch button K1 electrically connected to the MCUU2 to realize the turning on or turning off of the bark control device based on the electrical signal fed back by the MCUU2 when the user presses the switch button K1.

The switch assembly 5 includes a function button K2 electrically connected to the MCUU2. When the user presses the function button K2, the MCUU2 switches the punishment mode, adjusts the intensity of the electric shock, or adjusts the intensity of the vibration according to the electrical signals fed back by the function button K2, to allow the user to adjust the punishment mode, adjust the intensity of the punishment, and adjust the sensitivity level. Among them, the punishment mode may be one or more of vibration, electric shock and sound.

It should be noted that in the breed of the actual pet, the barking sound, a sound volume, and characteristics of each dog will vary. Depending on the size and characteristics of the barking of different dogs, the bark control device needs to be configured with the characteristics of the barking of different dogs. The MCUU2 drives the punishment module 6 to punish the pets when the electrical signal fed back from the sound detection unit 1 is greater than a predetermined value, and the predetermined value mentioned here can be selected by using the function key K2. That is, the MCUU2 is internally set with different characteristics of the sound. The sensitivity level can be adjusted by operating the function keys K2, thus adapting to different pets.

Figure 19:
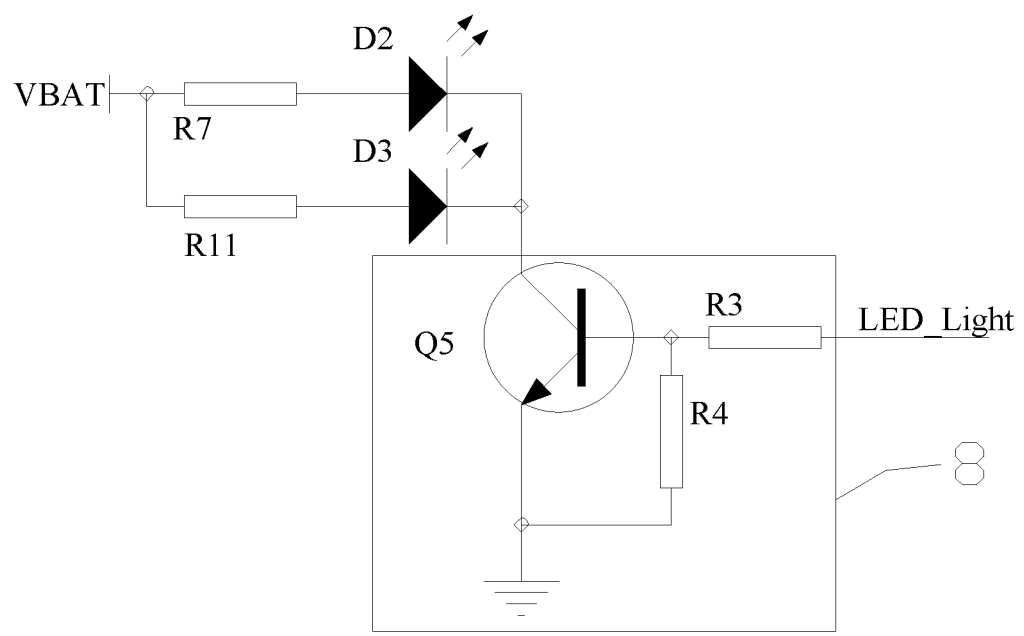
FIG. 19 shows a circuit diagram of an indication unit of the present invention.

Referring to FIG. 19, the bark control device further includes an indicator unit D2 and an indicator drive unit 8. The indicator unit D2 is electrically connected to the MCUU2 and the power supply module 3 respectively. The indicator drive unit 8 is electrically connected to the indicator unit D2 and the MCUU2 respectively. The indicator drive unit 8 is energized according to an electrical signal output from the MCUU2 to drive the indicator unit D2 to work. The indicator light is used to illuminate when the bark control device is turned on, or to twinkle when the punishment module 6 is working, thus serving as an indicator. The indicator drive unit 8 includes a sixth transistor Q5, a fourteenth resistor R3, and a fifteenth resistor R4, and the base of the sixth transistor Q5 is connected to the MCUU2 through the fourteenth resistor R3, and the emitter of the sixth transistor Q5 is grounded. The collector of the sixth transistor Q5 is connected to the output terminal of the indication unit D2. The two ends of the fifteenth resistor R4 are electrically connected to the base and emitter of the sixth transistor Q5 respectively. When an indication is required, the MCUU2 outputs an electrical signal to the sixth transistor Q5, and the sixth transistor Q5 conducts to drive the indication unit D2, and the indication unit D2 lights up to serve as an indication. Specifically, the indication unit D2 is a lamp bead or an LED lamp.

The above description only describes embodiments of the present disclosure, and is not intended to limit the present disclosure, various modifications and changes can be made to the present disclosure. Any modifications, equivalent substitutions, improvements made within the spirit and scope of the present disclosure are intended to be included within the scope of the present disclosure.

What is claimed is:

1. A bark control device comprising an MCU, and a punishment module, a display module and a power supply module, the punishment module and the display module each being electrically connected to the power supply module;

the display module being configured for displaying multicolor graphic information according to a control signal from the MCU, the graphic information comprising at least one of a punishment mode of the punishment module, a punishment intensity level of the punishment module, an electric quantity information, and a sensitivity level.

2. The bark control device according to claim 1, wherein the display module comprises: a liquid crystal drive unit electrically connected to the MCU, a liquid crystal display electrically connected to the liquid crystal drive unit, a backlight unit electrically connected to the MCU and the power supply module, the backlight unit is configured for providing a backlight source for the liquid crystal display, and a first drive unit connected between the MCU and the backlight unit;

the MCU is configured for driving the liquid crystal display through the liquid crystal drive unit while controlling the first drive unit turn-on to control the turning on and off of the backlight unit.

3. The bark control device according to claim 2, wherein the backlight unit is a light emitting diode, and the first driving unit comprises a first transistor, a first resistor, and a second resistor;

one end of the first resistor is electrically connected to the MCU, the other end of the first resistor is connected to a base of the first transistor, an emitter of the first transistor is grounded, a collector of the first transistor is connected to a negative electrode of the light-emitting diode, and two ends of the second resistor are respectively connected to the base of the first transistor and the emitter of the first transistor, and an output end of the power supply module is electrically connected with a positive electrode of the light-emitting diode for supplying the light-emitting diode power.

4. The bark control device according to claim 1, wherein the display module comprises: a light emitting assembly electrically connected to the MCU, a light guide plate provided in the light emitting assembly and directing the light source of the light emitting assembly, and a patterned panel provided on one side of the light guide plate away from one end of the light emitting assembly;

the light guide plate has a through-hole at a position corresponding to the light emitting assembly, and the patterned panel is provided with a light-transmitting pattern for transmitting light, and light from the light emitting assembly passes through the through-hole and the light-transmitting pattern in sequence, and then the light-transmitting pattern is projected out.

5. The bark control device according to claim 4, wherein the light-transmitting pattern comprises a power indication pattern for transmitting light out and an electric quantity pattern for transmitting light out, the electric quantity pattern is next to the power indication pattern, the through-hole comprises a first hole corresponding to a position of the power indication pattern and a second hole corresponding to a position of the electric quantity pattern; the light emitting assembly comprises a first light emitting body corresponding to a position of the first hole and a second light emitting body corresponding to a position of the second hole, and both of the first light emitting body and second light emitting body are electrically connected to the MCU.

6. The bark control device according to claim 5, wherein the light-transmitting pattern comprises a vibration indication pattern for transmitting light out, the through-hole comprises a third hole corresponding to a position of the vibration indication pattern, and the light-emitting assembly comprises a third light-emitting body corresponding to a position of the third hole and electrically connected to the MCU; and the vibration indication pattern is in the form of a circle, and there is provided in the middle an opaque dot and a plurality of opaque arc-shaped portions disposed adjacent to the dot.

7. The bark control device according to claim 6, wherein the light-transmitting pattern comprises an electric shock indication pattern for transmitting light out, the through-hole comprises a fourth hole corresponding to a position of the electric shock indication pattern, and the light-emitting assembly comprises a fourth light-emitting body corresponding to a position of the fourth hole and electrically connected to the MCU; and the electric shock indication pattern is in the form of a circle and is provided with an opaque slash portion and two broken line portions located at two sides of the slash portion.

8. The bark control device according to claim 7, wherein the light-transmitting pattern comprises a numerical pattern for displaying an intensity level in the shape of "8", the through-hole comprises a fifth hole corresponding to a position of the numerical pattern, and the light-emitting assembly comprises seven fifth light-emitting bodies corresponding to a position of the fifth hole and electrically connected to the MCU, and the seven fifth light-emitting bodies are in a distribution of a shape of an Arabic numeral "8".

9. The bark control device according to claim 1, wherein the bark control device further comprises a sound detection unit electrically connected to the MCU, the sound detection unit is used to convert the picked up sound into an electrical signal and then feed back to the MCU, and the MCU is configured for driving the punishment module to work according to the electrical signal fed back from the sound detection unit.

10. A bark control device according to claim 9, wherein the sound detection unit comprises a microphone, a third resistor, a fourth resistor, a fifth resistor, a sixth resistor, a first capacitor, a second capacitor and an operational amplifier;

a first pin of the operational amplifier is connected to an output of a power supply module, the output of the power supply module is also electrically connected to a positive electrode of a microphone through a third resistor, the positive electrode of the microphone is connected to the third pin of the operational amplifier through a first capacitor and a fourth resistor in sequence, a fourth pin of the operational amplifier is connected to the MCU through a fifth resistor, the fourth pin of the operational amplifier is connected to its third pin through a sixth resistor, and the second capacitor is connected in parallel with the sixth resistor.

11. The bark control device according to claim 9, wherein the bark control device further comprises a motion detection unit electrically connected to the MCU and configured for detecting a movement of the pet's laryngeal prominence; the motion detection unit is configured for feeding back an electrical signal to the MCU when it detects the occurrence of a movement, and the MCU is configured for driving the punishment module to work according to the electrical signal fed back from the motion detection unit and according to the electrical signal fed back from the sound detection unit.

12. The bark control device according to claim 11, wherein the motion detection unit comprises a motion sensing chip, the power supply module is electrically connected to a third pin of the motion sensing chip, the MCU is connected to an SCL pin of the motion sensing chip for transmitting a clock signal to the motion sensing chip, an SDA pin of the motion sensing chip is electrically connected to the MCU for transmitting to the MCU a detected motion signal after the detected motion signal has been converted into an electrical signal, and the MCU is configured for driving the punishment module to work based on the signal fed back from the SDA pin of the motion sensing chip.

13. The bark control device according to claim 12, wherein the bark control device further comprises a voltage stabilizing unit connected between the power supply module and the motion sensing chip, the voltage stabilizing unit being used to output a voltage output from the power supply module to the motion sensing chip after regulating the voltage;

the voltage stabilizing unit comprises a voltage stabilizing chip and a seventh resistor, a first pin of the voltage stabilizing chip is connected to an output of the power supply module, a second pin of the voltage stabilizing chip is grounded, a fifth pin of the voltage stabilizing chip is connected to a third pin of the motion sensing chip, and a third pin of the voltage stabilizing chip is connected to the MCU via the seventh resistor.

14. The bark control device according to claim 12, wherein the punishment module comprises a vibration punishment unit, the vibration punishment unit comprising a vibration motor, a motor interface, and a motor drive unit electrically connected to the MCU, the motor interface being electrically connected to the vibration motor, the motor drive unit, and the power supply module respectively; and the motor drive unit is energized by an electrical signal output from the MCU in order to drive the vibration motor to work via the motor interface;

the motor driving unit comprises an eighth resistor, a ninth resistor and a third transistor, the MCU connecting a base of the third transistor via the eighth resistor, the base electrode of the third transistor connecting its emitter via the ninth resistor, an emitter of the third transistor being grounded, and the collector electrode of the third transistor connecting to a negative electrode of the vibration motor through the motor interface.

15. The bark control device according to claim 14, wherein the punishment module comprises a sound unit, the sound unit comprises a sound driving unit and a sound player; a positive electrode of the sound player is electrically connected to the output of the power supply module, and the sound driving unit is electrically connected to the MCU, a negative electrode of the sound player; the sound driving unit is configured for driving the sound player to play according to an electrical signal output from the MCU;

the sound player comprises a loudspeaker, the sound driving unit includes a fourth transistor, a tenth resistor, and an eleventh resistor, a base of the fourth transistor is connected to an MCU through the tenth resistor, an emitter of the fourth transistor is grounded, a collector of the fourth transistor is connected to a positive electrode of the loudspeaker, and two ends of the eleventh resistor are connected respectively to the base and the emitter of the fourth transistor; and the fourth transistor is conducted according to the electrical signal output by the MCU in order to drive the loudspeaker to play sound.

16. The bark control device according to claim 15, wherein the punishment module comprises an electric shock punishment unit, the electric shock punishment unit comprising: a voltage output terminal, a transformer electrically connected to the voltage output terminal, and an electric shock drive unit electrically connected to the transformer and the MCU, respectively;

the output terminal of the power supply module is also electrically connected to the transformer for supplying power to the transformer, and the electric shock drive unit is conducted according to control signals output from the MCU to enable the transformer to output a voltage to the voltage output terminal.

17. The bark control device according to claim 16, wherein the electric shock driving unit comprises a fifth transistor, a twelfth resistor, a thirteenth resistor; a base of the fifth transistor is connected to the MCU through the twelfth resistor, an emitter of the fifth transistor is grounded, a collector of the fifth transistor is connected to the positive electrode of the speaker; and two ends of the thirteenth resistor are connected to the base and the emitter of the fifth transistor, respectively; and the fourth transistor conducts according to the electrical signals output by the MCU in order to drive the speaker to play sound.

18. The bark control device according to claim 1, wherein the bark control device further comprises a switch assembly electrically connected to the MCU for operation by the user, and the MCU realizes at least one of powering on, powering off, switching to the punishment mode, and adjusting the intensity of the punishment of the bark control device according to the electrical signal fed back by the switch assembly.

19. The bark control device according to claim 1, wherein the switch assembly comprises a switch button electrically connected to the MCU, the MCU realizing power on or power off of the bark control device according to the electrical signal fed back from the switch button;

the switch assembly comprises a function button electrically connected to the MCU, and the MCU is configured for switching to at least one of a punishment mode, adjusting the intensity of electric shock, adjusting the intensity of vibration, and a sensitivity level according to the electrical signal fed back from the function button.

20. The bark control device according to claim 1, wherein the bark control device further comprises: an indication unit electrically connected to the MCU and the power supply module, and an indication driving unit electrically connected to the indication unit and the MCU respectively; the indication driving unit conducts according to an electrical signal output from the MCU to drive the indication unit to work;

the indication driving unit includes a sixth transistor, a fourteenth resistor and a fifteenth resistor, a base of the sixth transistor is connected to the MCU through the fourteenth resistor, an emitter of the sixth transistor is grounded, a collector of the sixth transistor is connected to an output of the indication unit, and two ends of the fifteenth resistor are respectively electrically connected to the base and emitter of the sixth transistor.

* * * * *